No. 12,468.

REISSUED MAR. 27, 1906.

C. S. SHALLENBERGER.

BODY BOLSTER FOR RAILWAY CARS.

APPLICATION FILED JAN. 13, 1906.

2 SHEETS—SHEET 1.

Witnesses
A. J. McCauley.
Lenore Nilson

Inventor:
Charles S. Shallenberger
by Bakewell Cornwall
Atty's.

No. 12,468. REISSUED MAR. 27, 1906.

C. S. SHALLENBERGER.

BODY BOLSTER FOR RAILWAY CARS.

APPLICATION FILED JAN. 13, 1906.

2 SHEETS—SHEET 2.

Witnesses

A. J. McCauley

Lenore Nilson

Inventor:

Charles S. Shallenberger by Bakewell Cornwall

Atty's.

UNITED STATES PATENT OFFICE.

CHARLES S. SHALLENBERGER, OF ST. LOUIS, MISSOURI.

BODY-BOLSTER FOR RAILWAY-CARS.

No. 12,468. Specification of Reissued Letters Patent. Reissued Mar. 27, 1906.

Original No. 751,875, dated February 9, 1904. Application for reissue filed January 13, 1906. Serial No. 295,983.

*To all whom it may concern:*

Be it known that I, CHARLES S. SHALLENBERGER, a citizen of the United States, residing at the city of St. Louis, State of Missouri, have invented a certain new and useful Improvement in Body-Bolsters for Railway-Cars, of which the following is a full, clear, and exact description, such as will enable others skilled in the art to which it appertains to make and use the same, reference being had to the accompanying drawings, forming part of this specification.

This invention relates to body-bolsters for railway-cars; and it consists of the novel construction, combination, and arrangement of parts hereinafter shown, described, and claimed.

One object of this invention is to provide a metallic car-bolster consisting of a bolster-body formed in one casting and provided with a recess in its under side and a combined center bearing and compression-block adapted to be located within said recess to completely fill the same, together with the sill members, which are also extended through the recess.

Another object is to provide a bolster with a recess to receive the central longitudinal members of the car in a position that they can support the draft appliances without any intermediate connections, and thereby receive all the strain directly and at the same time be in such a position relative to the side members that they can readily be brought to the same level by use of the usual nailing-strips.

Figure 1:
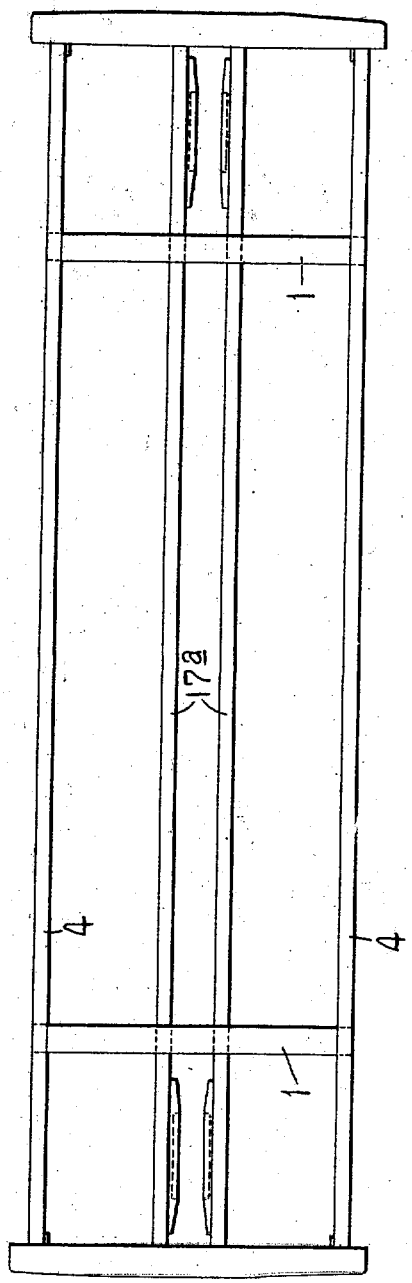
Figure 2:
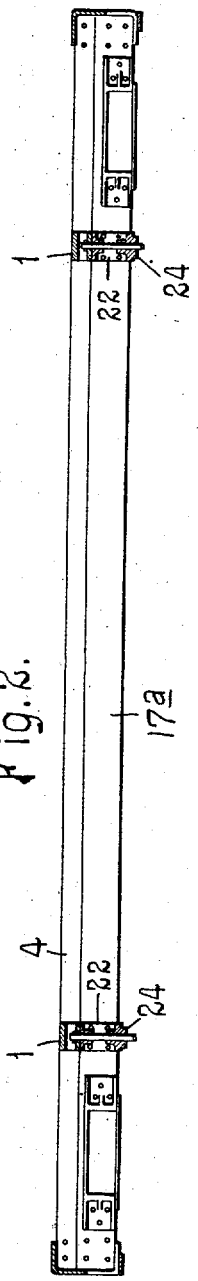
Figure 3:
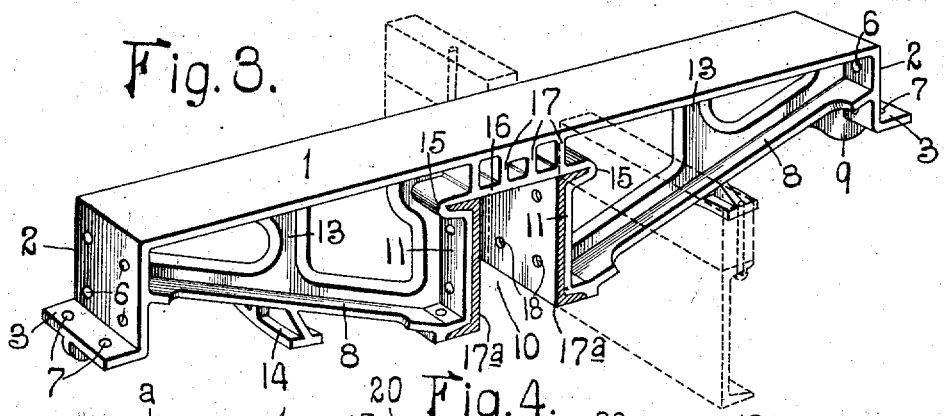
Figure 4:
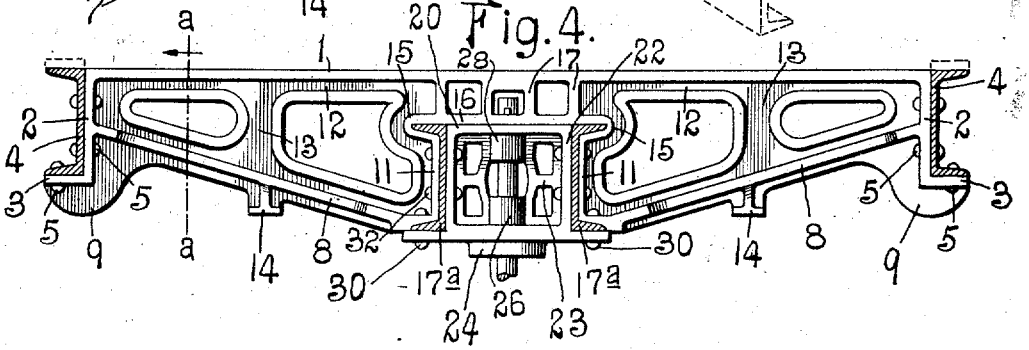
Figure 5:
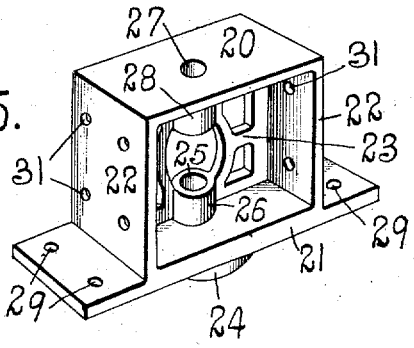
Figure 6:
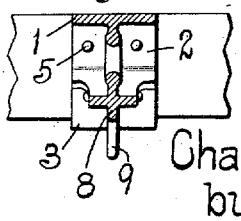

Figure 1 is a plan view of an underframe showing my improved bolster in position thereon. Fig. 2 is a central longitudinal sectional view through said underframe. Fig. 3 is a perspective view of the body-bolster with the center plate and compression-block removed. Fig. 4 is a side elevation of the bolster with the center plate and compression-block in position in the recess, the sill members being shown in section. Fig. 5 is a perspective view of the center plate and compression-block; and Fig. 6 is a cross-section of the bolster, taken on the line *a a* of Fig. 4, looking to the left.

The main body of the bolster consists of the top 1 in the form of a flat plate, the ends of which are extended downwardly, as indicated by 2, and provided with outward projections 3, whereby the side sill members 4 are supported. The said members, as shown, are preferably in the form of channel-irons; but of course any other desired form may be used, and they may be held in position upon the ends of the bolster by the rivets or bolts 5, which are passed through openings formed in the said members and through the openings 6 and 7, formed in the vertical extensions 2 and the outward projection 3, respectively.

8 indicates the lower members, forming the main body of the bolster, which extend outwardly and upwardly, as shown, and their outer ends terminating at and being formed integral with the vertical extensions 2, with which they are reinforced by means of the integral webs 9, connecting the said members 8 and the lower ends of the extensions 2 and the projections 3. Between the inner ends of the bottom members 8 is a recess 10, and the said inner ends of these members are connected with the top 1 by the vertical sides 11, which are preferably of equal width with the top and are cast integral therewith and with the ends of the lower members 8. The under side at the top at each side of the recess so formed by the vertical members 11 is strengthened by an integral web or flange 12, which extends from the said members 11 to the extensions 2 and downwardly along the said extensions and over and along the upper sides of the lower members 8. The upper and lower members are further braced by the vertical webs 13, which are directly above the side bearings 14, formed integral with the lower sides of the members 8. At a suitable distance below the top 1 the members 11 are curved outwardly, as indicated by 15, forming grooves or notches adapted to receive the flanges of channel-irons which may be used as the sill members. Directly above these notches the members 11 are connected by the integral cross-piece 16, which is reinforced by the webs 17, connecting the same with the top 1 of the body of the bolster.

As clearly shown in Fig. 4, the sill members $17^a$ are preferably in the form of channel-irons, having their flanges turned outwardly and the upper ends of said flanges resting within the notches formed below the cross-piece 16 in the side members 11. These sill members are then secured in position by bolts or other fastening devices passing therethrough and through the openings 18, formed in the side members 11.

By referring to Fig. 3, it will be seen that after the sill members are in position there is considerable space between the said members, which I fill by a combined center plate and compression-block formed in a single casting and consisting of the top 20 and the bottom 21, connected by the side members 22 and the reinforcing webs or flanges 23. The bearing 24 is formed integral with the under side of the bottom member 21. An opening 25 is formed through the bearing 24 and through the bottom 21, and around the said opening on the upper side of the bottom 21 is a reinforcing web or flange 26. An opening 27, similar to the opening 25, is formed through the top 20, and the said top is strengthened on its under side by means of an annular flange 28, which surrounds the opening 27. The purpose of the said openings is to receive the king-bolt, which is shown in position in Fig. 4 and is held in position by means of a key or other suitable device, which will prevent its withdrawal or displacement.

As shown in Fig. 5, the ends of the bottom 21 of the plate and compression-block extend beyond the sides 22, and openings 29 are formed through these extensions and are adapted to receive the bolts 30 for supporting the center bearing and compression-block in position. Similar openings 31 are formed through the sides 22 to receive the bolts 32, which are passed through the said openings and through the openings formed in the sill members and the openings 18, above referred to. When the center plate and compression-block is thus secured in position, it forms a complete connection between the ends of the bolster, thereby preventing any downward pressure of the ends which might occur were the central space 10 left unfilled. In addition to serving as the compression-block to strengthen the bolster and uphold the ends thereof it forms a center plate or bearing adapted to rest upon the center bearing of the car-bolster and to receive the king-bolt, whereby the body of the car is held on the truck. It will be understood that the side bearings 14 are located over side bearings of the car-bolster and will form the side supports to hold the car against tilting.

In Figs. 3 and 4 I have shown the nailing-strips in position upon the side sill members 4 and the central and draft sill members 17[a], raising these several members to a common level to receive and support the car-floor. An important feature of this construction consists in the location of the central sill members, which, as shown and above explained, are low enough to receive directly the entire strain of the draft and buffing operations. No intermediate connections are necessary to connect the draft appliances to these sill members, nor are they any heavier or more bulky than the side sill members. If found desirable, that part of the bolster between the cross-piece 16 and the top 1 of the bolster can be reduced, so that the central sill members can be raised to nearly the same height as the side sill members 4. Thus it is seen that I lower in the bolster both the side and central sill members, bringing them all into substantially the same plane and connecting the draft appliances directly to the central sill members, thereby giving greater strength to these devices and omitting those connecting parts which are necessary in the bolsters of usual construction, in which the longitudinal sill members of the car are carried upon the bolster above the draft appliances.

Having thus described the invention, what is claimed as new, and desired to be secured by Letters Patent, is—

1. A body-bolster composed of a casting having a recess formed in its under side adapted to receive the sill members, and a combined center plate and compression-block adapted to be located within said recess between the sill members; substantially as described.

2. A body-bolster for railway-cars consisting of a casting having a recess in its under side adapted to receive the sill members, a combined center plate and compression-block located in said recess between the sill members, and means for holding the said center bearing and compression-block permanently in position within said recess; substantially as described.

3. A body-bolster for railway-cars consisting of a casting having downward and outward extensions at its ends, and provided with a recess in its under side adapted to receive the sill members, a combined center bearing and compression-block located in said recess between the sill members, and means for holding the said center bearing and compression-block in position thereon; substantially as described.

4. A car-bolster for railway-cars comprising a casting consisting of a top having downward and outward extensions integral with its ends, lower members having their outer ends formed integral with the said extensions, integral connections 11 connecting the inner ends of the lower members with the top, there being a recess or space between the said members adapted to receive the sill members, a combined center bearing and compression-block located within said recess or space and between the sill members, and means for holding the said center bearing and compression-block in position; substantially as described.

5. A body-bolster for railway-cars, consisting of a casting having a recess in its under side adapted to receive the sill members, a combined center plate and compression-block located in said recess, and means for holding the said center bearing and compression-block permanently in position within said recess; substantially as described.

6. The combination with longitudinal sills extending from end to end of the car, of a bolster composed of a casting and having a recess in its under side adapted to receive said sill members, and a center plate closing the under side of the recess and acting as a compression member for the bolster; substantially as described.

7. The combination with longitudinal sill members, of bolsters near each end thereof, each bolster being composed of a casting having a recess in its under side, and a center plate closing said recess, said center plate also serving as a compression member of the bolster; substantially as described.

8. The combination with longitudinal sills, of bolsters arranged near each end thereof, each bolster having a recess in its under side to receive said sills, a compression-block arranged between the sills, and a center bearing arranged under the sills; substantially as described.

9. The combination with longitudinal sills, bolsters arranged thereon near the ends of said sills, each of said bolsters comprising a casting having a recess in its under side designed to receive the sills, a compression-block in said recess between the sills, and a center plate closing the lower side of said recess and arranged under the sills and compression-block; substantially as described.

In testimony whereof I hereunto affix my signature, in the presence of two witnesses, this 10th day of January, 1906.

CHARLES S. SHALLENBERGER.

Witnesses:

F. R. CORNWALL,

GEORGE RAKEWELL.